US008812327B2

(12) United States Patent
Virette et al.

(10) Patent No.: US 8,812,327 B2
(45) Date of Patent: Aug. 19, 2014

(54) CODING/DECODING OF DIGITAL AUDIO SIGNALS

(75) Inventors: David Virette, Munich (DE); Stéphane Ragot, Lannion (FR); Balazs Kovesi, Lannion (FR); Pierre Berthet, Noyal-Châtillon-sur-Seiche (FR)

(73) Assignee: France Telecom, Paris (FR)

(*) Notice: Subject to any disclaimer, the term of this patent is extended or adjusted under 35 U.S.C. 154(b) by 143 days.

(21) Appl. No.: 13/382,786

(22) PCT Filed: Jun. 25, 2010

(86) PCT No.: PCT/FR2010/051307
§ 371 (c)(1), (2), (4) Date: Mar. 23, 2012

(87) PCT Pub. No.: WO2011/004197
PCT Pub. Date: Jan. 13, 2011

(65) Prior Publication Data

US 2012/0185255 A1 Jul. 19, 2012

(30) Foreign Application Priority Data

Jul. 7, 2009 (FR) ..................................... 09 54682

(51) Int. Cl.

| | |
|---|---|
| ***G10L 19/00*** | (2013.01) |
| ***G10L 19/02*** | (2013.01) |
| ***G10L 19/12*** | (2013.01) |
| ***G10L 21/00*** | (2013.01) |
| ***G10L 21/02*** | (2013.01) |
| ***G10L 21/04*** | (2013.01) |
| ***G10L 25/00*** | (2013.01) |
| ***G06F 15/00*** | (2006.01) |
| ***H04N 19/00*** | (2014.01) |

(52) U.S. Cl.
USPC ........... 704/500; 704/200; 704/222; 704/226; 704/227; 704/229; 704/501; 704/503; 704/504

(58) Field of Classification Search
CPC ......... G10L 19/00; G10L 15/26; G10L 19/02; G10L 21/00; G10L 19/12; G10L 21/02; G10L 21/04; G10L 25/00; G06F 17/2247; G06F 17/30312; G06F 1/04; G06F 21/44; G06F 9/4401; G06F 9/544; G06F 15/00; H04N 19/00
USPC .......................... 704/200, 222, 226, 229, 500
See application file for complete search history.

(56) References Cited

U.S. PATENT DOCUMENTS 5,666,465 A * 9/1997 Ozawa .......................... 704/222

(Continued)

OTHER PUBLICATIONS

International Search Report and Written Opinion dated Oct. 6, 2010 for corresponding International Application No. PCT/FR2010/051307, filed Jun. 25, 2010.

(Continued)

*Primary Examiner* — Edgar Guerra-Erazo
*Assistant Examiner* — Thuykhanh Le
(74) *Attorney, Agent, or Firm* — David D. Brush; Westman, Champlin & Koehler, P.A.

(57) ABSTRACT

A method of hierarchical coding of a digital audio frequency input signal into several frequency sub-bands, including a core coding of the input signal according to a first throughput and at least one enhancement coding of higher throughput, of a residual signal. The core coding uses a binary allocation according to an energy criterion. The method includes for the enhancement coding: calculating a frequency-based masking threshold for at least part of the frequency bands processed by the enhancement coding; determining a perceptual importance per frequency sub-band as a function of the masking threshold and as a function of the number of bits allocated for the core coding; binary allocation of bits in the frequency sub-bands processed by the enhancement coding, as a function of the perceptual importance determined; and coding the residual signal according to the bit allocation. Also provided are a decoding method, a coder and a decoder.

12 Claims, 11 Drawing Sheets

(56) References Cited

U.S. PATENT DOCUMENTS

| | | | | |
|---|---|---|---|---|
| 5,864,801 | A * | 1/1999 | Sugiyama et al. | 704/229 |
| 6,526,384 | B1 * | 2/2003 | Mueller et al. | 704/501 |
| 8,200,496 | B2 * | 6/2012 | Ashley et al. | 704/500 |
| 8,209,190 | B2 * | 6/2012 | Ashley et al. | 704/501 |
| 8,219,408 | B2 * | 7/2012 | Ashley et al. | 704/500 |
| 2003/0206558 | A1 * | 11/2003 | Parkkinen et al. | 370/477 |
| 2003/0220783 | A1 * | 11/2003 | Streich et al. | 704/200.1 |
| 2005/0010404 | A1 * | 1/2005 | Son et al. | 704/219 |
| 2006/0036435 | A1 * | 2/2006 | Kovesi et al. | 704/229 |
| 2008/0021712 | A1 * | 1/2008 | Fejzo | 704/500 |
| 2009/0306992 | A1 * | 12/2009 | Ragot et al. | 704/500 |
| 2009/0326931 | A1 * | 12/2009 | Ragot et al. | 704/220 |
| 2010/0017200 | A1 * | 1/2010 | Oshikiri et al. | 704/207 |
| 2010/0017204 | A1 * | 1/2010 | Oshikiri et al. | 704/222 |
| 2010/0121646 | A1 * | 5/2010 | Ragot et al. | 704/500 |
| 2010/0292986 | A1 * | 11/2010 | Vasilache et al. | 704/219 |
| 2011/0046946 | A1 * | 2/2011 | Liu et al. | 704/203 |

OTHER PUBLICATIONS

Jin A. et al., "Scalable Audio Coder Based on Quantizer Units of MDCT Coefficients" 1999 IEEE International Conference on Acoustics, Speech, and Signal Processing, Proceedings. ICASSP99 (Cat. No. 99CH36258), vol. 2, Mar. 15, 1999, pp. 897-900 XP010328465.

Sung-Kyo Jung et al., "An Embedded Variable Bit-Rate Coder Based on GSM EFR: EFR-EV" Acoustics, Speech and Signal Processing, 2008. ICASSP 2008. IEEE International Conference on, IEEE, Piscataway, NJ, USA, Mar. 31, 2008 pp. 4765-4768, XP031251664.

Kovesi B. et al., "A Scalable Speech and Audio Coding Scheme with Continuous Bitrate Flexibility" Acoustics, Speech, and Signal Processing, 2004. Proceedings, (ICASSP '04). IEEE International Conference on Montreal, May 17-21, 2004 Quebec, Canada May 17, 2004, Piscataway, NJ, USA, IEEE, Piscataway, NJ, USA, vol. 1, May 17, 2004, pp. 273-276, XP 010717618.

International Preliminary Report on Patentability and English translation of the Written Opinion dated Feb. 7, 2012 for corresponding International Application No. PCT/FR2010/051307, filed Jun. 25, 2010.

* cited by examiner

CODING/DECODING OF DIGITAL AUDIO SIGNALS

CROSS-REFERENCE TO RELATED APPLICATIONS

This application is a Section 371 National Stage Application of International Application No. PCT/FR2010/051307, filed Jun. 25, 2010, which is incorporated by reference in its entirety and published as WO 2011/004097 on Jan. 13, 2011, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The present disclosure relates to a processing of sound data.

This processing is suited especially to the transmission and/or storage of digital signals such as audiofrequency signals (speech, music, or the like).

The disclosure applies more particularly to hierarchical coding (or "scalable" coding) which generates a so-called "hierarchical" binary stream since it comprises a core bitrate and one or more improvement layer(s). The G.722 standard at 48, 56 and 64 kbit/s is an example of a bitrate-scalable codec, while the UIT-T G.729.1 and MPEG-4 CELP codecs are examples of codecs that are scalable in terms of both bitrate and bandwidth.

BACKGROUND OF THE DISCLOSURE

Detailed hereinafter is hierarchical coding, having the capability of providing varied bitrates, by apportioning into hierarchized subsets the information relating to an audio signal to be coded, in such a way that this information can be used in order of importance from the standpoint of quality of audio rendition. The criterion taken into account for determining the order is a criterion of optimization (or rather of lesser degradation) of the quality of the coded audio signal. Hierarchical coding is particularly suited to transmission on heterogeneous networks or those exhibiting time-varying available bitrates, or else to transmission destined for terminals exhibiting varying capabilities.

The basic concept of hierarchical (or "scalable") audio coding may be described as follows.

The binary stream comprises a base layer and one or more improvement layers. The base layer is generated by a fixed-bitrate codec, called a "core codec", guaranteeing the minimum quality of the coding. This layer must be received by the decoder to maintain an acceptable quality level. The improvement layers serve to improve the quality. It may, however, happen that they are not all received by the decoder.

The main benefit of hierarchical coding is that it then allows adaptation of the bitrate by simple "truncation of the binary stream". The number of layers (that is to say the number of possible truncations of the binary stream) defines the granularity of the coding. One speaks of "high granularity" coding if the binary stream comprises few layers (of the order of 2 to 4) and of "fine granularity" coding if it allows for example an increment of the order of 1 to 2 kbit/s.

The techniques of bitrate- and bandwidth-scalable coding, with a core coder of CELP type, in the telephonic band and one or more improvement layer(s) in the widened band, are more particularly described hereinafter. An example of such systems is given in the standard UIT-T G.729.1 from 8 to 32 kbit/s with fine granularity. The G.729.1 coding/decoding algorithm is summarized hereinafter.

1. Reminders Regarding the G.729.1 Coder

The G.729.1 coder is an extension of the UIT-T G.729 coder. It entails a modified G.729-core hierarchical coder producing a signal whose band ranges from the narrow band (50-4000 Hz) to the widened band (50-7000 Hz) with a bitrate of 8 to 32 kbit/s for conversational services. This codec is compatible with existing voice over IP equipment which uses the G.729 codec.

The G.729.1 coder is shown diagrammatically in FIG. 1. The widened-band input signal $s_{wb}$, sampled at 16 kHz, is firstly decomposed into two sub-bands by QMF ("Quadrature Mirror Filter") filtering. The low band (0-4000 Hz) is obtained by low-pass filtering LP (block 100) and decimation (block 101), and the high band (4000-8000 Hz) by high-pass filtering HP (block 102) and decimation (block 103). The filters LP and HP are of length 64.

The low band is preprocessed by a high-pass filter eliminating the components below 50 Hz (block 104), to obtain the signal $s_{LB}$, before narrow-band CELP coding (block 105) at 8 and 12 kbit/s. This high-pass filtering takes account of the fact that the useful band is defined as covering the interval 50-7000 Hz. The narrow-band CELP coding is a cascade CELP coding comprising as first stage a modified G.729 coding without preprocessing filter and as second stage an additional fixed CELP dictionary.

The high band is firstly preprocessed (block 106) to compensate for the aliasing due to the high-pass filter (block 102) combined with the decimation (block 103). The high band is thereafter filtered by a low-pass filter (block 107) eliminating the components between 3000 and 4000 Hz of the high band (that is to say the components between 7000 and 8000 Hz in the original signal) to obtain the signal $s_{HB}$. A parametric band extension (block 108) is carried out thereafter.

An important feature of the G.729.1 encoder according to FIG. 1 is the following. The error signal $d_{LB}$ of the low band is calculated (block 109) on the basis of the output of the CELP coder (block 105) and a predictive transform coding (of TDAC for "Time Domain Aliasing Cancellation" type in the G.729.1 standard) is carried out at the block 110. With reference to FIG. 1, it is seen in particular that the TDAC encoding is applied both to the error signal on the low band and to the filtered signal on the high band.

Additional parameters may be transmitted by the block 111 to a homologous decoder, this block 111 carrying out a processing termed "FEC" for "Frame Erasure Concealment", with a view to reconstructing erased frames, if any.

The various binary streams generated by the coding blocks 105, 108, 110 and 111 are finally multiplexed and structured as a hierarchical binary train in the multiplexing block 112. The coding is carried out per blocks of samples (or frames) of 20 ms, i.e. 320 samples per frame.

The G.729.1 codec therefore has an architecture as three coding steps comprising:

- the cascade CELP coding,
- the parametric band extension by the module 108, of TDBWE ("Time Domain Bandwidth Extension") type, and a predictive TDAC transform coding, applied after a transformation of MDCT ("Modified Discrete Cosine Transform") type.

2. Reminders Regarding the G.729.1 Decoder

The G.729.1 decoder is illustrated in FIG. 2. The bits describing each 20-ms frame are demultiplexed in the block 200.

The binary stream of the layers at 8 and 12 kbit/s is used by the CELP decoder (block 201) to generate the narrow-band synthesis (0-4000 Hz). That portion of the binary stream associated with the layer at 14 kbit/s is decoded by the band extension module (block 202). That portion of the binary stream associated with the bitrates above 14 kbit/s is decoded by the TDAC module (block 203). A processing of the pre-echoes and post-echoes is carried out by the blocks 204 and 207 as well as an enhancement (block 205) and a post-processing of the low band (block 206).

The widened-band output signal $\bar{s}_{wb}$, sampled at 16 kHz, is obtained by way of the bank of synthesis QMF filters (blocks 209, 210, 211, 212 and 213) integrating the inverse aliasing (block 208).

The description of the transform-coding layer is detailed hereinafter.

3. * Reminders Regarding the TDAC Transform Based Coder in the G.729.1 Coder

The transform coding of TDAC type in the G.729.1 coder is illustrated in FIG. 3.

The filter $W_{LB}(z)$ (block 300) is a perceptual weighting filter, with gain compensation, applied to the low-band error signal $d_{LB}$. MDCT transforms are thereafter calculated (block 301 and 302) to obtain:

the MDCT spectrum $D_{LB}^{w}$ of the difference signal, perceptually filtered, and the MDCT spectrum $S_{HB}$ of the original signal of the high band.

These MDCT transforms (blocks 301 and 302) are applied to 20 ms of signal sampled at 8 kHz (160 coefficients). The spectrum Y(k) arising from the fusion block 303 thus comprises 2×160, i.e. 320 coefficients. It is defined as follows:

$$[Y(0)Y(1)\ldots Y(319)]=[D_{LB}^{w}(0)D_{LB}^{w}(1)\ldots D_{LB}^{w}(159)S_{HB}(0)S_{HB}(1)\ldots S_{HB}(159)]$$

This spectrum is divided into eighteen sub-bands, a sub-band j being assigned a number denoted nb_coef(j) of coefficients. The slicing into sub-bands is specified in table 1 hereinafter.

Thus, a sub-band j comprises the coefficients Y(k) with sb_bound(j)≤k<sb_bound(j+1).

Note that the coefficients 280-319 corresponding to the 7000 Hz-8000 Hz frequency band are not coded; they are set to zero at the decoder, since the passband of the codec is from 50-7000 Hz.

TABLE 1

Limits and size of the sub-bands in TDAC coding

| J | sb_bound(j) | nb_coef (j) |
|---|---|---|
| 0 | 0 | 16 |
| 1 | 16 | 16 |
| 2 | 32 | 16 |
| 3 | 48 | 16 |
| 4 | 64 | 16 |
| 5 | 80 | 16 |
| 6 | 96 | 16 |
| 7 | 112 | 16 |
| 8 | 128 | 16 |
| 9 | 144 | 16 |

TABLE 1-continued

Limits and size of the sub-bands in TDAC coding

| J | sb_bound(j) | nb_coef (j) |
|---|---|---|
| 10 | 160 | 16 |
| 11 | 176 | 16 |
| 12 | 192 | 16 |
| 13 | 208 | 16 |
| 14 | 224 | 16 |
| 15 | 240 | 16 |
| 16 | 256 | 16 |
| 17 | 272 | 8 |
| 18 | 280 | — |

The spectral envelope $\{\text{log\_rms}(j)\}_{j=0,\ldots,17}$ is calculated in the block 304 according to the formula:

$$\text{log\_rms}(j)=\frac{1}{2}\log_2\left[\frac{1}{\text{nb\_coef}(j)}\sum_{k=sb\_bound(j)}^{sb\_bound(j+1)-1}Y(k)^2+\varepsilon_{rms}\right],$$

$$j=0,\ldots,17$$

where $\epsilon_{rms}=2^{-24}$.

The spectral envelope is coded at variable bitrate in the block 305. This block 305 produces quantized, integer values, denoted rms_index(j) (with j=0, . . . , 17), obtained by simple scalar quantization:

$$\text{rms\_index}(j)=\text{round}(2\cdot\text{log\_rms}(j))$$

where the notation "round" designates rounding to the nearest integer, and with the constraint:

$$-11\leq\text{rms\_index}(j)\leq+20$$

This quantized value rms_index(j) is transmitted to the bits allocation block 306.

The coding of the spectral envelope, itself, is further performed by the block 305, separately for the low band (rms_index(j), with j=0, . . . , 9) and for the high band (rms_index(j), with j=10, . . . , 17). In each band, two types of coding may be chosen according to a given criterion, and, more precisely, the values rms_index(j):

may be coded by so-called "differential Huffman" coding, or may be coded by natural binary coding.

A bit (0 or 1) is transmitted to the decoder to indicate the mode of coding which has been chosen.

The number of bits allocated to each sub-band for its quantization is determined at the block 306 on the basis of the quantized spectral envelope arising from the block 305.

The bit allocation performed minimizes the quadratic error while adhering to the constraint of an integer number of bits allocated per sub-band and of a maximum number of bits not to be exceeded. The spectral content of the sub-bands is thereafter coded by spherical vector quantization (block 307).

The various binary streams generated by the blocks 305 and 307 are thereafter multiplexed and structured as a hierarchical binary train at the multiplexing block 308.

4. Reminder Regarding the Transform Based Decoder in the G.729.1 Decoder

The step of TDAC type transform based decoding in the G.729.1 decoder is illustrated in FIG. 4.

In a symmetric manner to the encoder (FIG. 3), the decoded spectral envelope (block 401) makes it possible to retrieve the allocation of bits (block 402). The envelope decoding (block 401) reconstructs the quantized values of the spectral envelope (rms_index(j), for j=0, . . . , 17), on the basis of the binary train generated by the block 305 (multiplexed) and deduces therefrom the decoded envelope:

$$\text{rms\_}q(j)=2^{1/2\ rms\_index(j)}$$

The spectral content of each of the sub-bands is retrieved by inverse spherical vector quantization (block 403). The untransmitted sub-bands, for lack of sufficient "budget" of bits, are extrapolated (block 404) on the basis of the MDCT transform of the signal output by the band extension block (block 202 of FIG. 2).

After upgrading of this spectrum (block 405) as a function of the spectral envelope and post-processing (block 406), the MDCT spectrum is split into two (block 407):

- with 160 first coefficients corresponding to the spectrum $\overline{D}_{LB}{}^{w}$ of the perceptually filtered, low-band decoded difference signal,
- and 160 subsequent coefficients corresponding to the spectrum $\overline{S}_{HB}$ of the high-band decoded original signal.

These two spectra are transformed into temporal signals by inverse MDCT transform, denoted IMDCT (blocks 408 and 410), and the inverse perceptual weighting (filter denoted $W_{LB}(z)^{-1}$) is applied to the signal $\overline{d}_{LB}{}^{w}$ (block 409) resulting from the inverse transform.

The allocation of bits to the sub-bands (block 306 of FIG. 3 or block 402 of FIG. 4) is more particularly described hereinafter.

The blocks 306 and 402 carry out an identical operation on the basis of the values rms_index(j), j=0, . . . , 17. Therefore, hereinafter merely the operation of the block 306 is described.

The aim of the binary allocation is to apportion between each of the sub-bands a certain (variable) budget of bits, denoted nbits_VQ, with:

nbits_VQ=351−nbits_rms, where nbits_rms is the number of bits used by the coding of the spectral envelope.

The result of the allocation is the integer number of bits, denoted nbit(j) (with j=0, . . . , 17), allocated to each of the sub-bands with, as global constraint:

$$\sum_{j=0}^{17} nbit(j) \leq \text{nbits\_VQ}$$

In the G.729.1 standard, the values nbit(j) (j=0, . . . , 17), are moreover constrained by the fact that nbit(j) must be chosen from among a reduced set of values specified in table 2 hereinafter.

TABLE 2

Possible values of number of bits allocated in the TDAC sub-bands.

| Size of the sub-band j nb_coef(j) | Set of authorized values nbit(j) (in number of bits) |
|---|---|
| 8 | $R_8$ = {0, 7, 10, 12, 13, 14, 15, 16} |
| 16 | $R_{16}$ = {0, 9, 14, 16, 17, 18, 19, 20, 21, 22, 23, 24, 25, 26, 27, 28, 29, 30, 31, 32} |

The allocation in the G.729.1 standard relies on a "perceptual importance" per sub-band related to the energy of the sub-band, denoted ip(j) (j=0 . . . 17), defined as follows:

$$ip(j) = \frac{1}{2}\log_2(\text{rms\_q}(j)^2 \times \text{nb\_coef}(j)) + \text{offset}$$

where offset = −2.

Since the values rms_q(j)=$2^{1/2\ rms\_index(j)}$, this formula simplifies to the form:

$$ip(j) = \begin{cases} \frac{1}{2}\text{rms\_index}(j) & \text{for } j = 0, \ldots, 16 \\ \frac{1}{2}(\text{rms\_index}(j) - 1) & \text{for } j = 17 \end{cases}$$

On the basis of the perceptual importance of each sub-band, the allocation nbit(j) is calculated as follows:

$$nbit(j) = \arg\min_{r \in R_{nb\_coef(j)}} |\text{nb\_coef}(j) \times (ip(j) - \lambda_{opt}) - r|$$

where $\lambda_{opt}$ is a parameter optimized by dichotomy to satisfy the global constraint $$\sum_{j=0}^{17} nbit(j) \leq \text{nbits\_VQ}$$

by best approximating the threshold nbits_VQ.

The impact of the perceptual weighting (filtering of the block 300) on the allocation of bits (block 306) of the TDAC transform based coder is now described in greater detail.

In the G.729.1 standard, the TDAC coding uses the filter $W_{LB}(z)$ for perceptual weighting in the low band (block 300), as indicated hereinabove. In essence, the perceptual weighting filtering makes it possible to shape the coding noise. The principle of this filtering is to utilize the fact that it is possible to inject more noise into the zones of frequencies where the original signal has high energy.

The perceptual weighting filters most commonly used in narrow-band CELP coding are of the form $\overline{A}(z/\gamma\mathbf{1})/\overline{A}(z/\gamma\mathbf{2})$ where $0 \leq \gamma\mathbf{2} \leq \gamma\mathbf{1} < 1$ and $\overline{A}(z)$ represents a linear prediction spectrum (LPC). The synthesis based analysis in CELP coding thus amounts to minimizing the quadratic error in a signal domain weighted perceptually by this type of filter.

However, to ensure spectral continuity when the spectra $D_{LB}{}^{w}$ and $S_{HB}$ are adjoining (block 303 of FIG. 3), the filter $W_{LB}(z)$ is defined in the form:

$$W_{LB}(z) = fac\frac{\hat{A}(z/\gamma_1)}{\hat{A}(z/\gamma 2)}$$

with $\gamma_1$=0.96, $\gamma_2$=0.6 and $$fac = \left|\frac{\sum_{i=0}^{p}(-\gamma_2)^i\hat{a}_i}{\sum_{i=0}^{p}(-\gamma_1)^i\hat{a}_i}\right|$$

The factor fac makes it possible to ensure at the junction of the low and high bands (4 kHz) a gain of the filter at 1 to 4 kHz.

It is important to note that, in the TDAC coding according to the G.729.1 standard, the coding relies only on an energy criterion.

5. Drawbacks of the Prior Art

The energy criterion of the TDAC coding of G.729.1, used in the high band (4000-7000 Hz), is not optimal from a perceptual point of view, especially for coding music signals.

The perceptual weighting filter is particularly suited to speech signals. It is widely used in standards for speech coding based on the coding format of CELP type. However, for music signals, it is apparent that this perceptual weighting based on a shaping of the quantization noise in accordance with the formants of the input signal is insufficient. Most audio coders rely on a transform coding using frequency masking models, or simultaneous masking; they are more generic (in the sense that they do not use a CELP-like speech production model) and are therefore more suitable for coding music signals.

Reference may be made to the document entitled "Introduction to digital audio coding and standards", by M. Bosi and R. Goldberg, published by Kluver Academic Publishers, in 2003, to get more details about masking models and their application in transform based coders.

There therefore exists a requirement to improve the quality of coding of the signals for better perceptual rendition, while retaining interoperability with G.729.1 coding.

SUMMARY

An exemplary embodiment of the disclosure relates to a method for hierarchically coding a digital audiofrequency input signal as several frequency sub-bands comprising a core coding of the input signal according to a first bitrate and at least one improvement coding of higher bitrate of a residual signal, the core coding using a binary allocation according to an energy criterion. The method is such that it comprises the following steps for the improvement coding:

- calculation of a frequency masking threshold for at least part of the frequency bands processed by the improvement coding;
- determination of a perceptual importance per frequency sub-band as a function of the masking threshold calculated and as a function of the number of bits allocated for the core coding;
- binary allocation of bits in the frequency sub-bands processed by the improvement coding, as a function of the perceptual importance determined; and
- coding of the residual signal according to the allocation of bits.

Thus, the coding according to an embodiment of the invention profits from an improvement coding layer to improve the quality of coding from a perceptual point of view. The improvement layer will thus benefit from a frequency masking which does not exist in the core coding stage, so as to best allocate the bits in the frequency bands of the improvement coding.

This operation does not modify the core coding which thus remains compatible with the existing standardized coding, thus guaranteeing interoperability with the equipment already on the market which uses the existing standardized coding.

The various particular embodiments mentioned hereinafter may be added independently or in combination with one another, to the steps of the coding method defined hereinabove.

In a particular embodiment, the step of determining a perceptual importance comprises:

- a first step of defining a first perceptual importance for at least one frequency sub-band of the improvement coding, as a function of the frequency masking threshold in the sub-band, of quantized values of the coding of the spectral envelope for the frequency sub-band and of a determined normalization factor;
- a second step of subtracting from the first perceptual importance a ratio of the number of bits allocated for the core coding to the number of coefficients in said sub-band.

Thus, the first perceptual importance which will be used for the improvement layer, does not take into account the core coding but only the signal-to-mask ratio to define a perceptual importance. This perceptual importance is determined on the transform based coder input signal.

The core coding is taken into account simply by subtracting the mean number of bits per sample already allocated. The use of the perceptual importance based on the signal-to-mask ratio would make it possible to obtain an optimal allocation, in the perceptual sense. However this allocation would be useful if the input signal of the transform-coding layer were coded directly. Now, within the framework of an embodiment of the invention, a first transform-coding layer, based on an energy allocation, has allocated a certain number of bits per sub-band.

If it is desired to improve the quality by coding the residual signal of this layer of the core coder without wasting bitrate, it is necessary to adapt the perceptual importance based on the signal-to-mask ratio of the input signal to the residual signal. Accordingly, a value representative of the number of bits allocated in the core coder is subtracted from the first perceptual importance. It should be noted that it is not possible to calculate the perceptual importance based on the signal-to-mask ratio of a residual signal. Indeed, in this case the masking curve which would be calculated would not actually have any perceptive sense, since it would not be based on the signal actually perceived.

In a variant embodiment, the perceptual importance is determined furthermore as a function of bits allocated for a previous core coding improvement coding having a binary allocation according to an energy criterion.

In the G.729.1 decoder the untransmitted sub-bands, for lack of sufficient budget of bits, are extrapolated (block 404) on the basis of the MDCT transform of the signal output by the band extension block (block 202 of FIG. 2). Even at the highest bitrate of the G.729.1 coding (32 kbit/s) certain frequency bands thus remain extrapolated. Before applying the improvement coding according to an embodiment of the present invention, it is firstly possible to call upon a first improvement coding for the core coding so as to make up for the lack of bitrate of the core coding for these untransmitted sub-bands. This first improvement coding uses the original signal and operates according to energy criteria for the allocation of bits. According to one embodiment of the invention this first improvement coding modifies the number of bits nbit(j) allocated to the sub-bands and the decoded sub-band Yq(k) (defined later in FIG. 5).

The improvement coding according to an embodiment of the invention therefore also takes account of the bits allocated during this first improvement coding, in addition to the bits allocated in the core coding.

Advantageously, the masking threshold is determined for a sub-band, by a convolution between:

- an expression for a calculated spectral envelope, and
- a spreading function involving a central frequency of said sub-band.

In a variant embodiment, the method comprises a step of obtaining an item of information according to which the signal to be coded is tonal or non-tonal and the steps of calculating the masking threshold and of determining a perceptual importance as a function of this masking threshold, are undertaken only if the signal is non-tonal.

Thus, the coding is adapted to the signal be it tonal or not and allows optimal allocation of the bits.

In a particularly adapted application of an embodiment of the invention, the improvement coding is an improvement coding of TDAC type in an extended coder whose core coding is of G.729.1 standardized coder type.

Thus, the quality of the G.729.1 codec in the widened band (50-7000 Hz), is improved. Such an improvement is important so as to extend the band of the G.729.1 coder from the widened band (50-7000 Hz) to the super-widened band (50-14000 Hz).

An embodiment of the present invention also pertains to a method for hierarchically decoding a digital audiofrequency signal as several frequency sub-bands comprising a core decoding of a signal received according to a first bitrate and at least one improvement decoding of higher bitrate, of a residual signal, the core decoding using a binary allocation according to an energy criterion. The method is such that it comprises the following steps for the improvement decoding:

- calculation of a frequency masking threshold for at least part of the frequency sub-bands processed by the improvement decoding;
- determination of a perceptual importance per frequency sub-band as a function of the masking threshold calculated and as a function of the number of bits allocated for the core decoding;
- allocation of bits in the frequency sub-bands processed by the improvement decoding, as a function of the perceptual importance determined; and
- decoding of the residual signal according to the allocation of bits.

In the same manner and with the same advantages as for the coding the step of determining a perceptual importance comprises:

- a first step of defining a first perceptual importance for at least one frequency sub-band of the improvement decoding, as a function of the frequency masking threshold in the sub-band, of quantized values of the decoding of the spectral envelope for the frequency sub-band and of a determined normalization factor;
- a second step of subtracting from the first perceptual importance a ratio of the number of bits allocated for the core decoding to the number of coefficients in said sub-band.

An embodiment of the invention pertains to a hierarchical coder of a digital audiofrequency input signal as several frequency sub-bands comprising a core coder of the input signal according to a first bitrate and at least one improvement coder of higher bitrate, of a residual signal, the core coder using a binary allocation according to an energy criterion. The improvement coder comprises:

- a module for calculating a frequency masking threshold for at least part of the frequency bands processed by the improvement coder;
- a module for determining a perceptual importance per frequency sub-band as a function of the masking threshold calculated and as a function of the number of bits allocated for the core coder;
- a binary module for allocating bits in the frequency sub-bands processed by the improvement coder, as a function of the perceptual importance determined; and

- a module for coding the residual signal according to the allocation of bits.

It also pertains to a hierarchical decoder of a digital audiofrequency signal as several frequency sub-bands comprising a core decoder of a signal received according to a first bitrate and at least one improvement decoder of higher bitrate, of a residual signal, the core decoder using a binary allocation according to an energy criterion. The improvement decoder comprises:

- a module for calculating a frequency masking threshold for at least part of the frequency sub-bands processed by the improvement decoder;
- a module for determining a perceptual importance per frequency sub-band as a function of the masking threshold calculated and as a function of the number of bits allocated for the core decoder;
- a module for allocating bits in the frequency sub-bands processed by the improvement decoder, as a function of the perceptual importance determined; and
- a module for decoding the residual signal according to the allocation of bits.

Finally, an embodiment of the invention pertains to a computer program comprising code instructions for the implementation of the steps of a coding method according to an embodiment of the invention, when they are executed by a processor and to a computer program comprising code instructions for the implementation of the steps of a decoding method according to an embodiment of the invention, when they are executed by a processor.

BRIEF DESCRIPTION OF THE DRAWINGS

Other characteristics and advantages will be more clearly apparent on reading the following description, given solely by way of nonlimiting example, and with reference to the appended drawings in which.

DETAILED DESCRIPTION OF ILLUSTRATIVE EMBODIMENTS

An exemplary embodiment of the invention improves the quality of G.729.1 in a widened band (50-7000 Hz), especially for music signals. It is recalled here that G.729.1 coding has a useful band of 50 to 7000 Hz. Moreover the quality of G.729.1 for certain signals such as music signals is not transparent at its highest bitrate (32 kbit/s)—this limitation is due to the CELP+TDBWE+TDAC hierarchical structure and to the bitrate limited to 32 kbit/s.

An embodiment of the invention is motivated by the standardization in progress at the UIT-T of a scalable extension of G.729.1 aimed in particular at extending the band coded by G.729.1 to the super-widened band (50-14000 Hz). Experience shows that the band extension (e.g.: 7000-14000 Hz) of a signal with limited band (e.g.: 50-7000 Hz) requires a limited-band signal which is already of good quality; indeed the band extension emphasizes the existing defects in this signal. Thus, there exists a requirement to improve the quality of G.729.1 in a widened band (50-7000 Hz).

The improvement of the quality of G.729.1 may be achieved with one or more additional-bitrate improvement layers (in addition to 32 kbit/s). In practice these additional-bitrate improvement layers can serve both for the band extension (7000-14000 Hz) and for improving the quality in the widened band (50-7000 Hz). Thus part of the additional bitrate of the improvement layers may be devoted to improving the widened band signal decoded by a G.729.1 decoder.

Note that it is possible to distinguish two cores in the hierarchical coding considered in the present document: G.729.1 has a narrow-band CELP core coder, while the extension for super-widened band (50-14000 Hz) of G.729.1 has G.729.1 as core.

Hereinafter the terms core coding and core bitrate are understood to mean a coding of G.729.1 type and the associated bitrate of 32 kbit/s.

In one embodiment of the invention, we are more particularly concerned with a TDAC coder and decoder such as previously described, into which an improvement layer is integrated.

Figure 5:
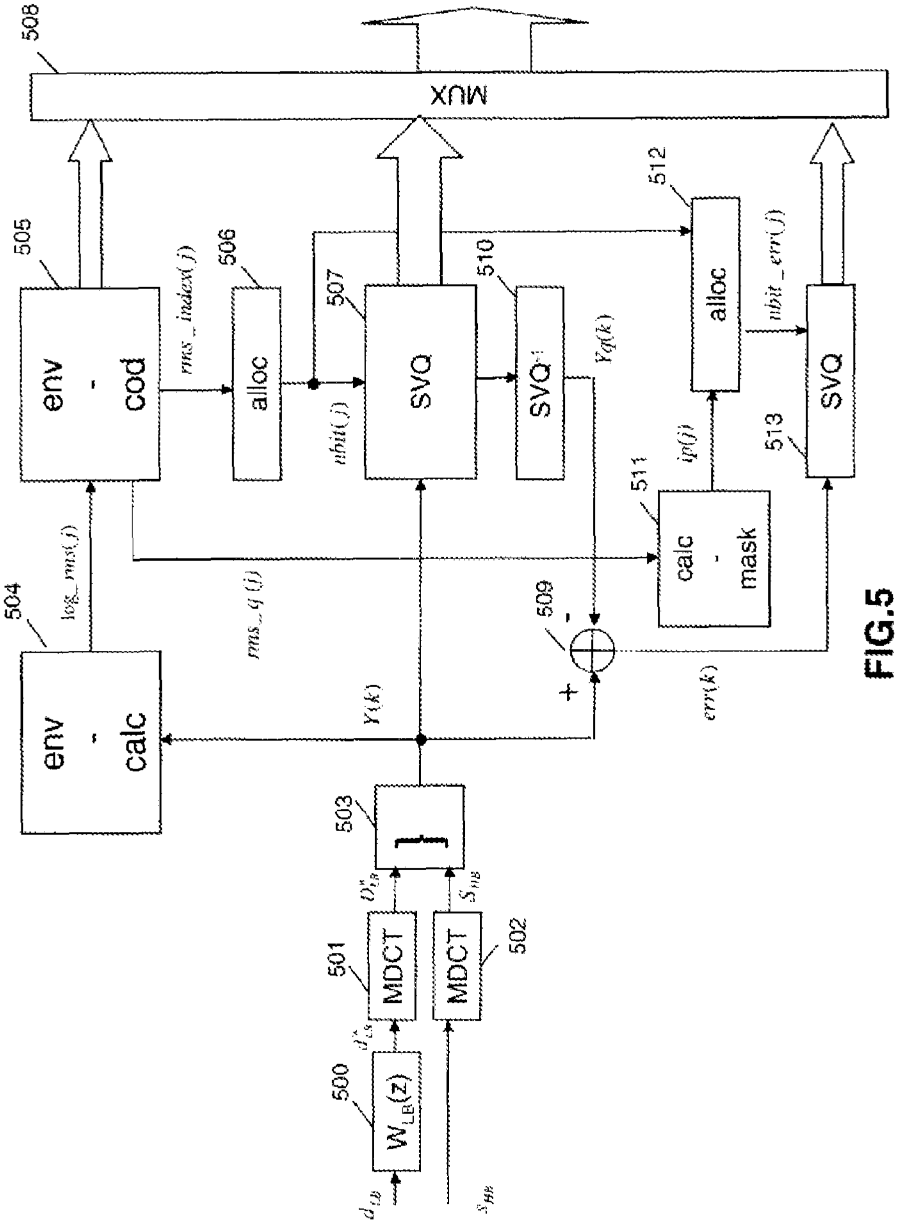
FIG. 5 illustrates the structure of a TDAC coder comprising an improvement coding according to one embodiment of the invention.

FIG. 5 describes an improved TDAC coder such as this.

A scalable extension of G.729.1 as several improvement layers is considered. Here the core coding is a G.729.1 coding, which uses a TDAC coding in the [50-7000 Hz] band on the basis of the bitrate of 14 kbit/s and up to 32 kbit/s. It is assumed that between 32 and 48 kbit/s two 8-kbit/s improvement layers are produced so as to extend the band from 7000 to 14000 Hz and to replace the untransmitted sub-bands of the TDAC coding of G.729.1. These 8 -kbit/s improvement layers making it possible to go from 32 to 48 kbit/s are not described here.

An embodiment of the invention pertains to two additional 8-kbit/s improvement layers of the TDAC coding in the band 50 to 7000 Hz and which switch the bitrate from 48 kbit/s to 56 and 64 kbit/s.

The coder applying an embodiment of the present invention comprises improvement layers which adds extra bitrate to the core bitrate of G.729.1 (32 kbits). These improvement layers serve both to improve the quality in the widened band (50-7000 Hz) and to extend the higher band from 7000 to 14000 Hz. Hereinafter the extension from 7000 to 14000 Hz is ignored, since this functionality does not influence the implementation of an embodiment of the present invention. For simplicity reasons the modules corresponding to the band extension from 7000 to 14000 Hz are not illustrated in FIGS. 5 and 6.

Figure 3:
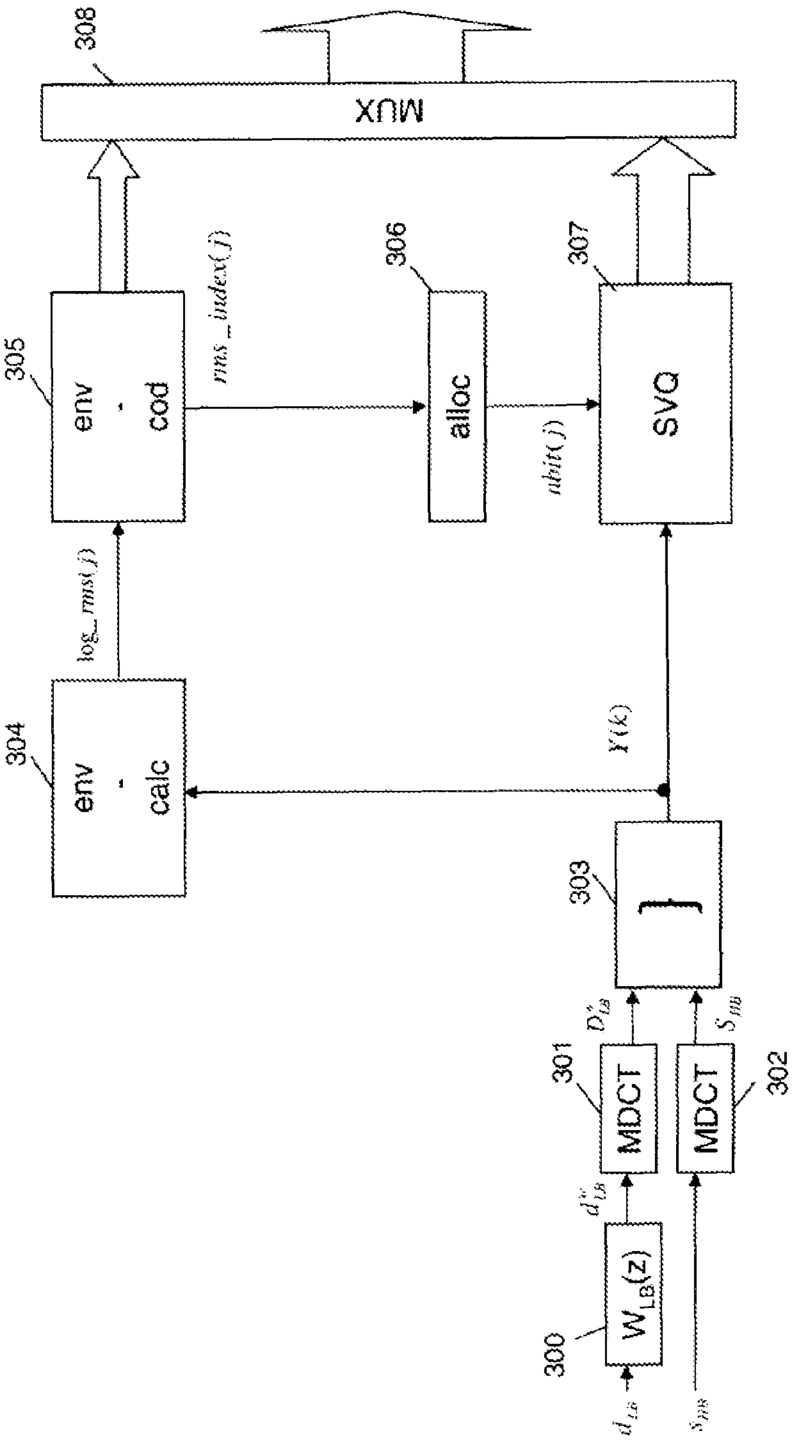
FIG. 3 illustrates the structure of a previously described TDAC coder included in the coder of G.729.1 type.

The same blocks (blocks 500 to 507) are depicted here as those used in the base layer of the G.729.1 (blocks 300 to 307) such as described with reference to FIG. 3.

Here the TDAC coder according to one embodiment of the invention comprises an improvement layer (blocks 509 to 513) which improves the core layer (blocks 504 to 507).

Note that here the block 507 corresponds to the spherical vector quantization (SVQ) of G.729.1, which can comprise a modification such as mentioned previously. Thus, in this block 507, a first improvement coding for the G.729.1 core coding is called upon so as to make up for the lack of bitrate for the untransmitted sub-bands (where nbit(j)=0). This modification uses the original signal Y(k) and operates according to energy criteria for the allocation of bits. The number of bits nbit(j) allocated to the sub-bands and the decoded sub-band Yq(k) are then modified.

The block 506 performs a binary allocation based on energy criteria such as is described with reference to FIG. 3.

The core layer is therefore coded and dispatched to the multiplexing module 508.

The core signal is also decoded locally in the coder by the block 510 which performs a spherical and scaled dequantization; this core signal is subtracted from the original signal at 509, in the transformed domain, to obtain a residual signal err(k). This residual signal is thereafter coded on the basis of a bitrate of 48 kbit/s, in the block 513.

The block 511 calculates a masking curve on the basis of the coded spectral envelope rms_q(j) obtained by the block 505, where j=0, . . . 17 is the sub-band number.

The masking threshold M(j) of the sub-band j is defined by the convolution of the energy envelope $\overline{\sigma}^2(j)=\text{rms\_q}(j)^2\times\text{nb\_coef}(j)$ with a spreading function B(v).

In a first embodiment, this masking is performed only on the high band of the signal, with:

$$M(j) = \sum_{k=10}^{17} \hat{\sigma}^2(k) \times B(v_j - v_k)$$

where $v_k$ is the central frequency of the sub-band k in Bark, the sign "×" designating "multiplied by", with the spreading function described hereinafter.

In more generic terms, the masking threshold M(j), for a sub-band j, is therefore defined by a convolution between:

- an expression for the spectral envelope, and
- a spreading function involving a central frequency of the sub-band j.

Figure 7:
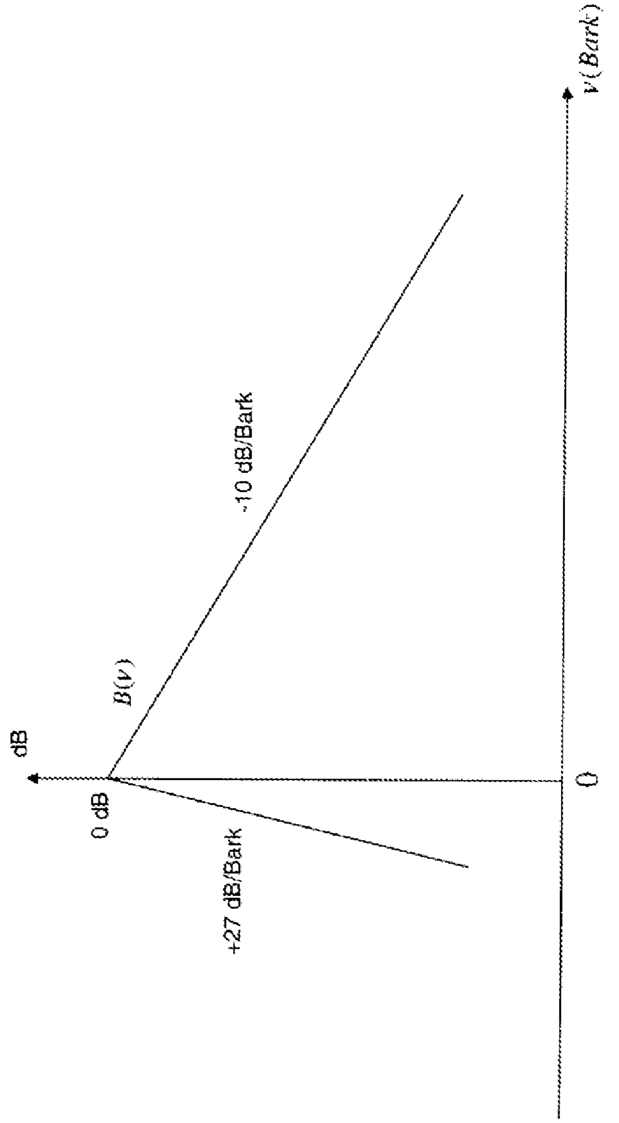
FIG. 7 illustrates an advantageous spreading function for the masking within the meaning of an embodiment of the invention.

An advantageous spreading function is that presented in FIG. 7. It entails a triangular function whose first slope is +27 dB/Bark and −10 dB/Bark for the second. This representation of the spreading function allows the following iterative calculation of the masking curve:

$$M(j) = \begin{cases} M^-(10) & j = 10 \\ M^+(j) + M^-(j) + \hat{\sigma}^2(j) & j = 1, \dots , 16 \\ M^+(17) & j = 17 \end{cases}$$

where $$M^{+}(j)=\overline{\sigma}^{2}(j-1)\cdot\Delta_{2}(j)+M^{+}(j-1)\cdot\Delta_{2}(j) \qquad j=11, \ldots, 17$$

$$M^{-}(j)=\overline{\sigma}^{2}(j+1)\cdot\Delta_{1}(j)+M^{-}(j+1)\cdot\Delta_{1}(j) \qquad j=10, \ldots 16$$

and $$\Delta_2(j) = 10^{\frac{-10}{10}(v_j - v_{j-1})}$$

$$\Delta_1(j) = 10^{\frac{27}{10}(v_j - v_{j+1})}$$

The values of $\Delta_1$(j) and $\Delta_2$(j) may be precalculated and stored.

The low band having already been filtered perceptually by the module 500, the application of the masking threshold is, in this embodiment, limited to the high band. So as to ensure spectral continuity between the low-band spectrum and the high-band spectrum weighted by the masking threshold and to avoid biasing the binary allocation, the masking threshold is normalized for example by its value on the last sub-band of the low band.

A first step of perceptual importance calculation is then performed by taking into account the signal-to-mask ratio given by:

$$\frac{1}{2}\log_2\left(\frac{\hat{\sigma}^2(j)}{M(j)}\right)$$

The perceptual importance is therefore defined as follows in the block 511:

$$ip(j) = \begin{cases} \frac{1}{2}\log_2(\hat{\sigma}^2(j)) + \text{offset} & \text{for } j = 0 \ldots 9 \\ \frac{1}{2}\left[\log_2\left(\frac{\hat{\sigma}^2(j)}{M(j)}\right) + normfac\right] + \text{offset} & \text{for } j = 10 \ldots 17 \end{cases}$$

where offset=−2 and normfac is a normalization factor calculated in accordance with the relation:

$$normfac = \log_2\left[\sum_{j=9}^{17} \hat{\sigma}^2(j) \times B(v_9 - v_j)\right]$$

It is noted that the perceptual importance ip(j), j=0, . . . , 9, is identical to that defined in the G.729.1 standard. On the other hand, the definition of the term ip(j), j=10, . . . , 17, is changed.

The perceptual importance defined hereinabove may now be written:

$$ip(j) = \begin{cases} \frac{1}{2}\text{rms\_index}(j) & \text{for } j = 0, \ldots, 9 \\ \frac{1}{2}[\text{rms\_index}(j) - \text{log\_mask}(j)] & \text{for } j = 10, \ldots, 17 \end{cases}$$

where log_mask(j)=$\log_2$ (M(j))−normfac.

Figure 8:
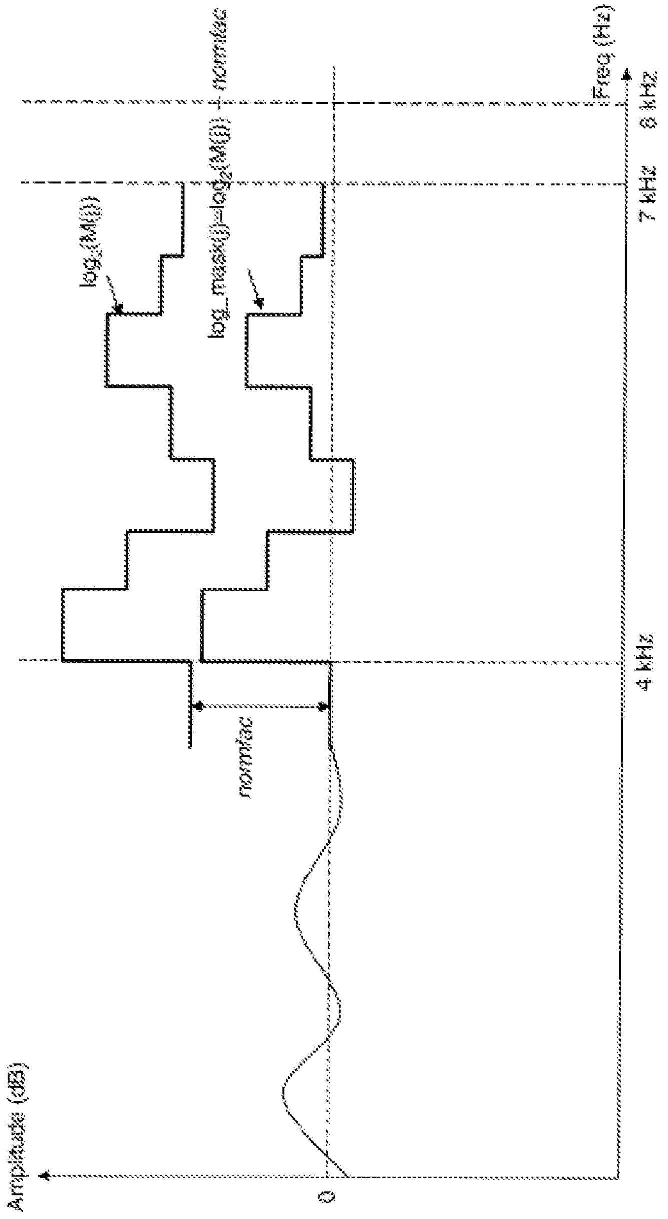
FIG. 8 illustrates a normalization of the masking curve, in one embodiment of the invention.

An illustration of the normalization of the masking threshold is given in FIG. 8, showing the joining of the high band, on which the masking (4-7 kHz) is applied, to the low band (0-4 kHz).

In a variant of this embodiment where the normalization of the masking threshold is performed with respect to its value on the last sub-band of the low band, the normalization of the masking threshold may rather be carried out on the basis of the value of the masking threshold in the first sub-band of the high band, as follows:

$$normfac = \log_2\left[\sum_{j=10}^{17} \hat{\sigma}^2(j) \times B(v_{10} - v_j)\right]$$

In yet another variant, the masking threshold may be calculated on the whole frequency band, with:

$$M(j) = \sum_{k=0}^{17} \hat{\sigma}^2(k) \times B(v_j - v_k)$$

The masking threshold is thereafter applied solely to the high band after normalizing the masking threshold by its value on the last sub-band of the low band:

$$normfac = \log_2\left[\sum_{j=0}^{17} \hat{\sigma}^2(j) \times B(v_9 - v_j)\right],$$

or else by its value on the first sub-band of the high band:

$$normfac = \log_2\left[\sum_{j=0}^{17} \hat{\sigma}^2(j) \times B(v_{10} - v_j)\right]$$

Of course, these relations giving the normalization factor normfac or the masking threshold M(j) are generalizable to any number (different, in total, than eighteen) of sub-bands in the high band (with a different number than eight), as in the low band (with a different number than ten).

On the basis of this frequency masking calculation, a first perceptual importance ip(j), is dispatched to the binary allocation block 512 for the improvement coding.

This block 512 also receives the bit allocation information nbit(j) for the core layer of the G.729.1, TDAC coding.

The block 512 thus defines a new perceptual importance which takes both these items of information into account. Thus, a second perceptual importance is defined as follows:

$$ip'(j) = ip(j) - \frac{nbit(j)}{\text{nb\_coeff}(j)} \quad \text{for } j = 1, \ldots, 18$$

where nbit(j) represents the number of bits allocated by the base layer to the frequency band j, and nb_coeff(j) represents the number of coefficients of the band j according to table 1 described previously.

Stated otherwise, the new perceptual importance is calculated by subtracting from the first perceptual importance, a ratio of the number of bits allocated for the core coding to the number of possible coefficients in the sub-band.

With this new perceptual importance, the block 512 performs an allocation of bits on the residual signal so as to code the improvement layer.

This allocation of bits is calculated as follows:

$$\text{nbit\_err}(j) = \arg_{r \in R_{nb\_coef(j)}} \min \left| \text{nb\_coef}(j) \times (ip'(j) - \lambda_{opt}) - r \right|$$

where the optimization must satisfy the constraint $$\sum_{j=0}^{17} \text{nbit\_err}(j) \leq \text{nbits\_VQ\_err}$$

nbits_VQ_err corresponding to the additional number of bits in the improvement layer (320 bits for the two 8-kbits layers).

It therefore takes into account the new calculated perceptual importance.

The residual signal err(k) is thereafter coded by the module 513 by spherical vector quantization, by using the number of bits allocated nbit_err(j), such as calculated previously.

This coded residual signal is thereafter multiplexed with the signal arising from the core coding and the coded envelope, by the multiplexing module 508.

This improvement coding extends not only the allocated bitrate but improves, from a perceptual point of view, the coding of the signal.

It is recalled that the improvement layer of the TDAC coding such as described can be applied after having modified the TDAC coding of G.729.1. In the 32-kbits to 48-kbits improvement layers, a first improvement (not described here) of the TDAC coding of G.729.1 is carried out. This improvement allocates bits to the sub-bands lying between 4 and 7 kHz to which no bitrate has been allocated by the TDAC core coding of G.729.1 even at its highest bitrate of 32 kbit/s. This first improvement of the TDAC coding of G.729.1 therefore uses the original signal between 4 and 7 kHz and does not implement the steps of calculating a masking threshold or of determining the perceptual importance of the coding method of an embodiment of the invention. It is considered that the block 507 corresponds to this modified TDAC coding integrating this improvement.

Thus, in the improvement layer of the coding method of an embodiment of the invention, at bitrates ranging from 48 kbit/s to 64 kbit/s, the determination of the perceptual importance (blocks 511, 512) takes account not only of the bits allocated for the core coding or base coding but also the bits allocated for the previous improvement coding, in this instance, the 40-kbit/s bitrate improvement coding.

FIG. 5 illustrates not only the TDAC coder with its improvement coding stage but also serves for an illustration of the steps of the coding method according to one embodiment, such as described previously, of the invention and especially of the steps of:

- calculation of a frequency masking threshold for at least part of the frequency bands processed by the improvement coding;
- determination of a perceptual importance per frequency sub-band as a function of the masking threshold calculated and as a function of the number of bits allocated for the core coding;
- binary allocation of bits in the frequency sub-bands processed by the improvement coding, as a function of the perceptual importance determined; and
- coding of the residual signal according to the allocation of bits.

Figure 6:
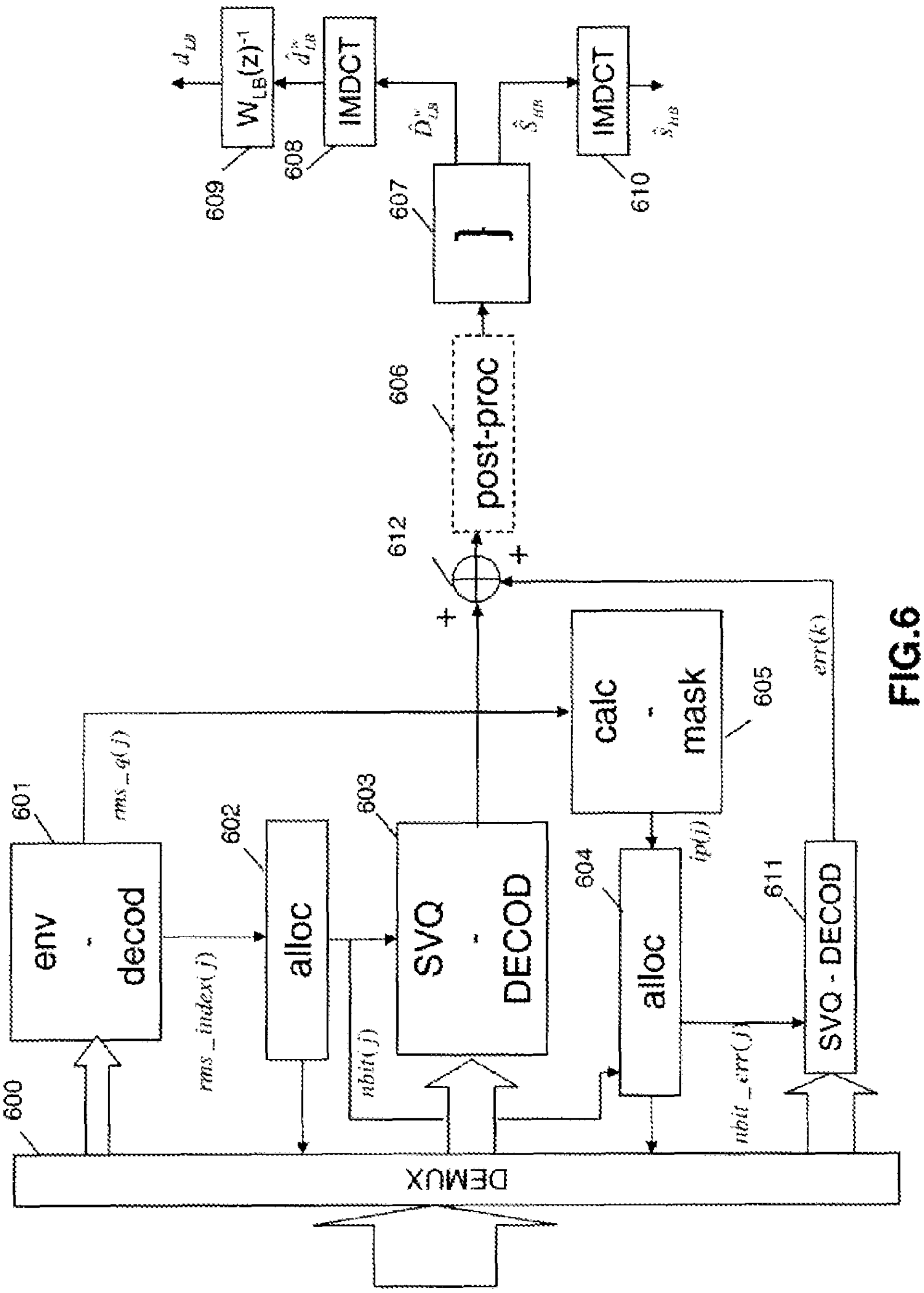
FIG. 6 illustrates the structure of a TDAC decoder comprising an improvement decoding according to one embodiment of the invention.

FIG. 6 illustrates the TDAC decoder with an improvement decoding stage as well as the steps of a decoding method according to one embodiment of the invention. The decoder comprises the modules (601, 602, 603, 606, 607, 608, 609 and 610) identical to those described for the TDAC decoding of the G.729.1 coder with reference to FIG. 4 (401, 402, 403, 406, 407, 408, 409 and 410). Note that the block 606 for postprocessing in the MDCT domain (aimed at shaping the coding noise) is optional here since an embodiment of the invention improves the quality of the decoded MDCT spectrum arising from the block 603.

The module 605 of the decoder corresponds to the module 511 of the coder and operates in the same manner on the basis of the quantized values of the spectral envelope.

On the basis of the first perceptual importance ip(j) calculated by this module 605, the allocation module 604 determines a second perceptual importance by taking into account the allocation of bits received from the core coding, in the same manner as in the module 512 of the coding.

This allocation of bits for the improvement coding allows the module 611 to decode the signal received from the demultiplexing module 600, by spherical vector dequantization.

The decoded signal arising from the module 611 is an error signal err(k) which is thereafter combined at 612, with the core signal decoded at 603.

Figure 4:
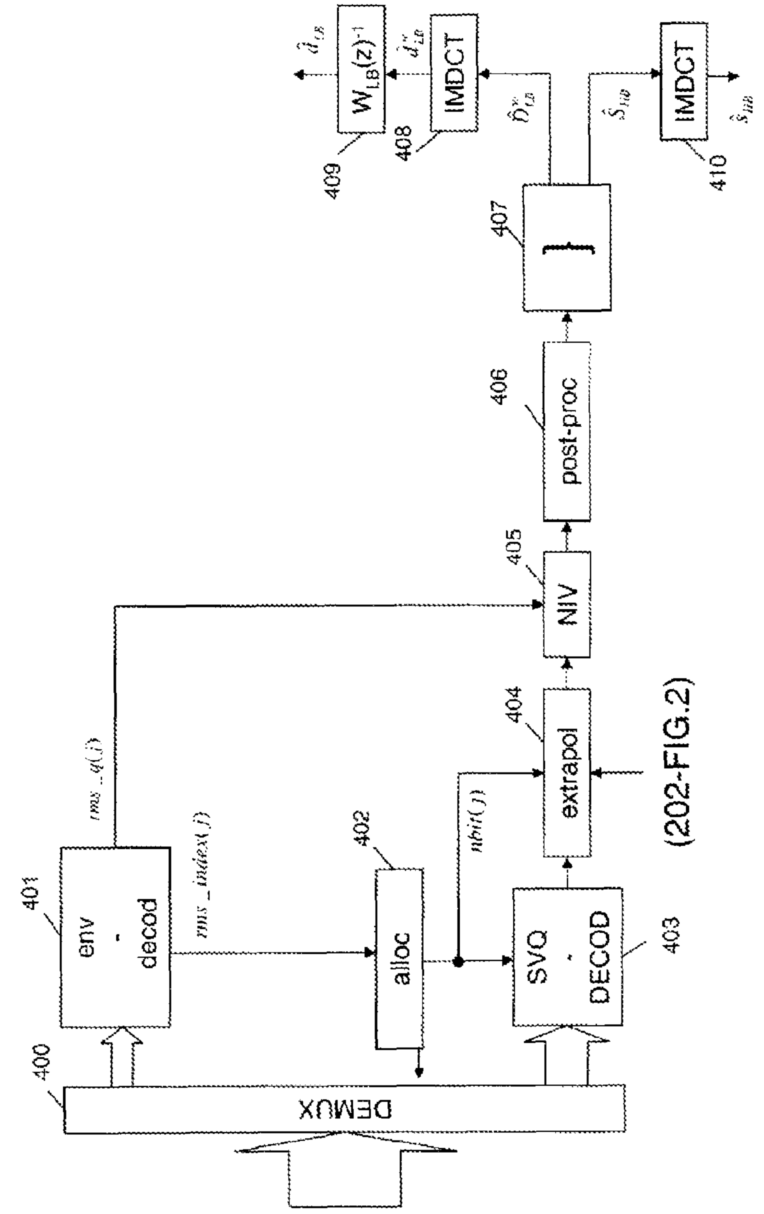
FIG. 4 illustrates the structure of a TDAC decoder such as previously described, included in a decoder of G.729.1 type.

This signal is thereafter processed as for the G.729.1 coding described with reference to FIG. 4, to give a low-band difference signal $d_{LB}$ and a high-band signal $S_{HB}$.

It is also indicated that the calculation of a frequency masking performed by the module 511 or 605 and such as described previously, may or may not be performed depending on the signal to be coded (in particular whether or not it is tonal).

Indeed, it has been possible to observe that the calculation of the masking threshold is particularly advantageous when the signal to be coded is not tonal.

If the signal is tonal, the application of the spreading function B(v) results in a masking threshold which is very close to a tone that is slightly more spread in terms of frequencies. The criterion for minimizing the ratio of coding noise to mask then gives an allocation of bits which is not necessarily optimal.

To improve this allocation, it is therefore possible to use an allocation of bits in accordance with energy criteria for a tonal signal.

Thus, in a variant embodiment, the calculation of the masking threshold and the determination of the perceptual importance as a function of this masking threshold is applied only if the signal to be coded is not tonal.

In generic terms, an item of information is therefore obtained (from the block 505) according to which the signal to be coded is tonal or non-tonal, and the perceptual weighting of the high band, with the determination of the masking threshold and the normalization, are undertaken only if the signal is non-tonal.

With a core coding of G.729.1 type, the bit relating to the mode of coding of the spectral envelope (block 505 or 601) indicates a "differential Huffman" mode or a "direct natural binary" mode. This mode bit may be interpreted as a detection of tonality, since, in general, a tonal signal leads to an envelope coding by the "direct natural binary" mode, while most non-tonal signals, having a more limited spectral dynamic range, lead to an envelope coding by the "differential Huffman" mode.

Thus, an advantage may be derived from the "detection of tonality of the signal" to implement the frequency masking or otherwise. More particularly, this masking threshold calculation is applied in the case where the spectral envelope has been coded in "differential Huffman" mode and the first perceptual importance is then defined within the meaning of an embodiment of the invention, as follows:

$$ip(j)=\begin{cases}\frac{1}{2}\text{rms\_index}(j) & \text{for } j=0 \ldots 9\\ \frac{1}{2}[\text{rms\_index}(j)-\text{log\_mask}(j)] & \text{for } j=10 \ldots 17\end{cases}$$

On the other hand, if the envelope has been coded in "direct natural binary" mode, the first perceptual importance remains as defined in the G.729.1 standard:

$$ip(j)=\begin{cases}\frac{1}{2}\text{rms\_index}(j) & \text{for } j=0, \ldots , 16\\ \frac{1}{2}(\text{rms\_index}(j)-1) & \text{for } j=17\end{cases}$$

A possible application of an embodiment of the invention to an extension of the G.729.1 encoder, in particular to super-widened band, is now described.

Figure 9:
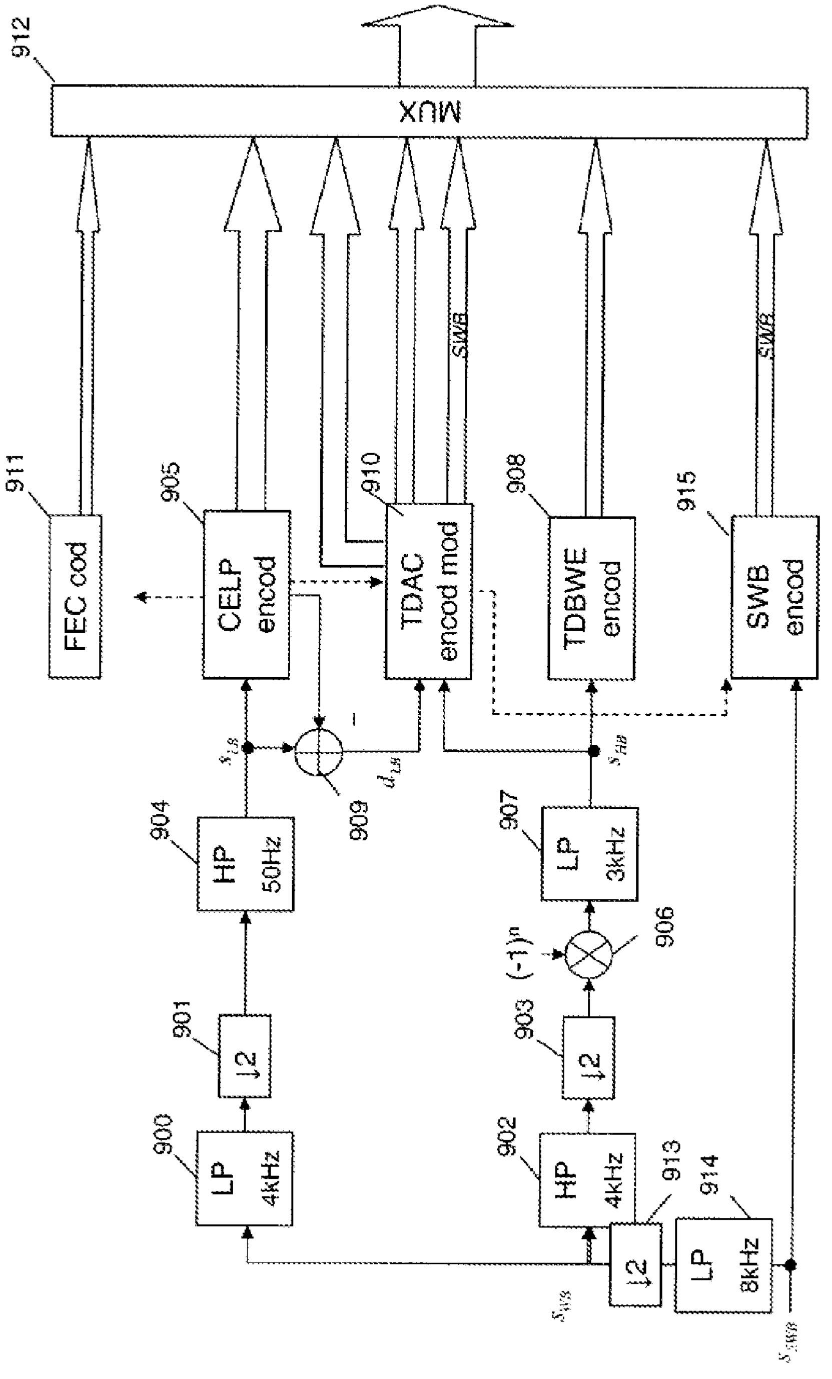
FIG. 9 illustrates the structure of a frequency-band-extended G.729.1 coder in which a TDAC coder according to one embodiment of the invention is included.

With reference to FIG. 9, such a coder is illustrated. The extension to super-widened band of the G.729.1 coder such as represented consists of an extension of the frequencies coded by the module 915, the frequency band used switching from [50 Hz-7 KHz] to [50 Hz-14 kHz] and of an improvement of the base layer of the G.729.1 by the TDAC coding module (block 910) and such as described with reference to FIG. 5.

Figure 1:
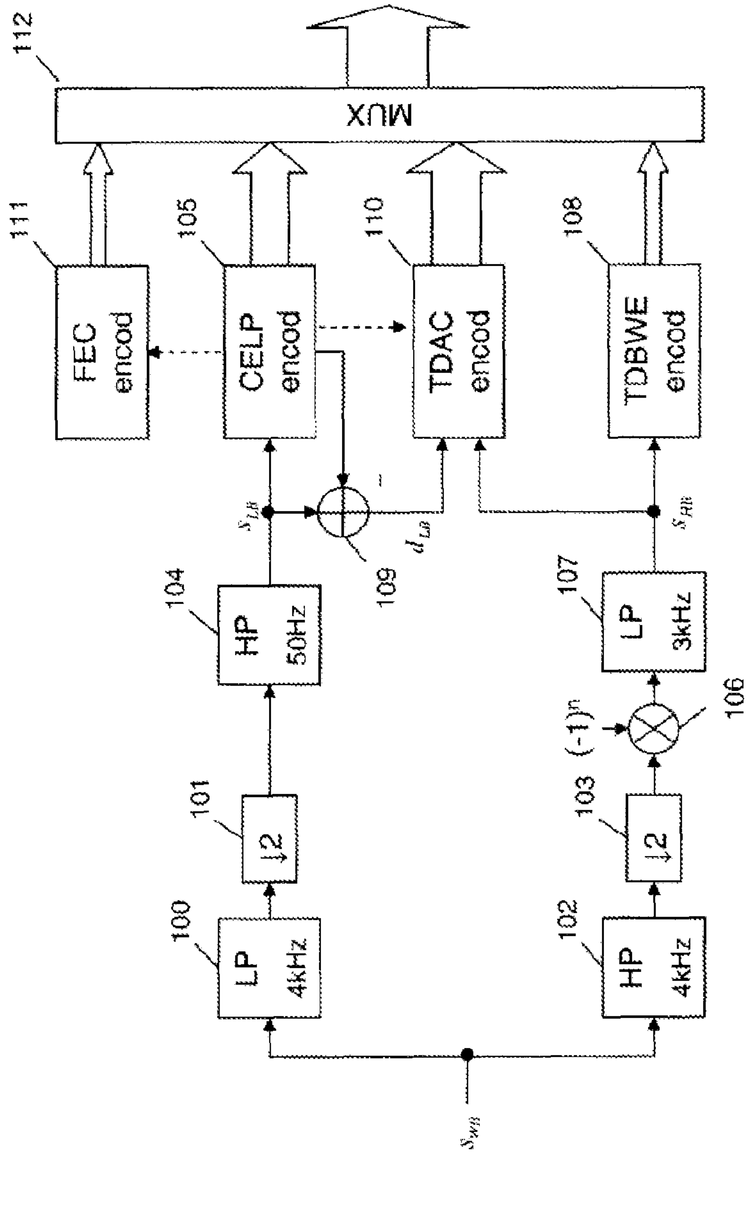
FIG. 1 illustrates the structure of a previously described coder of G.729.1 type.

Thus, the coder such as represented in FIG. 9, comprises the same modules as the G.729.1 core coding represented in FIG. 1 and an additional module for band extension 915 which provides the multiplexing module 912 with an extension signal.

This frequency band extension is calculated on the full band original signal $S_{SWB}$ whereas the input signal for the core coder is obtained by decimation (block 913) and low-pass filtering (block 914). At the output of these blocks, the widened-band input signal $S_{WB}$ is obtained.

The TDAC coding module 910 is different from that illustrated in FIG. 1. This module is for example that described with reference to FIG. 5 and provides the multiplexing module with both the coded core signal and the improvement signal coded according to an embodiment of the invention.

Figure 10:
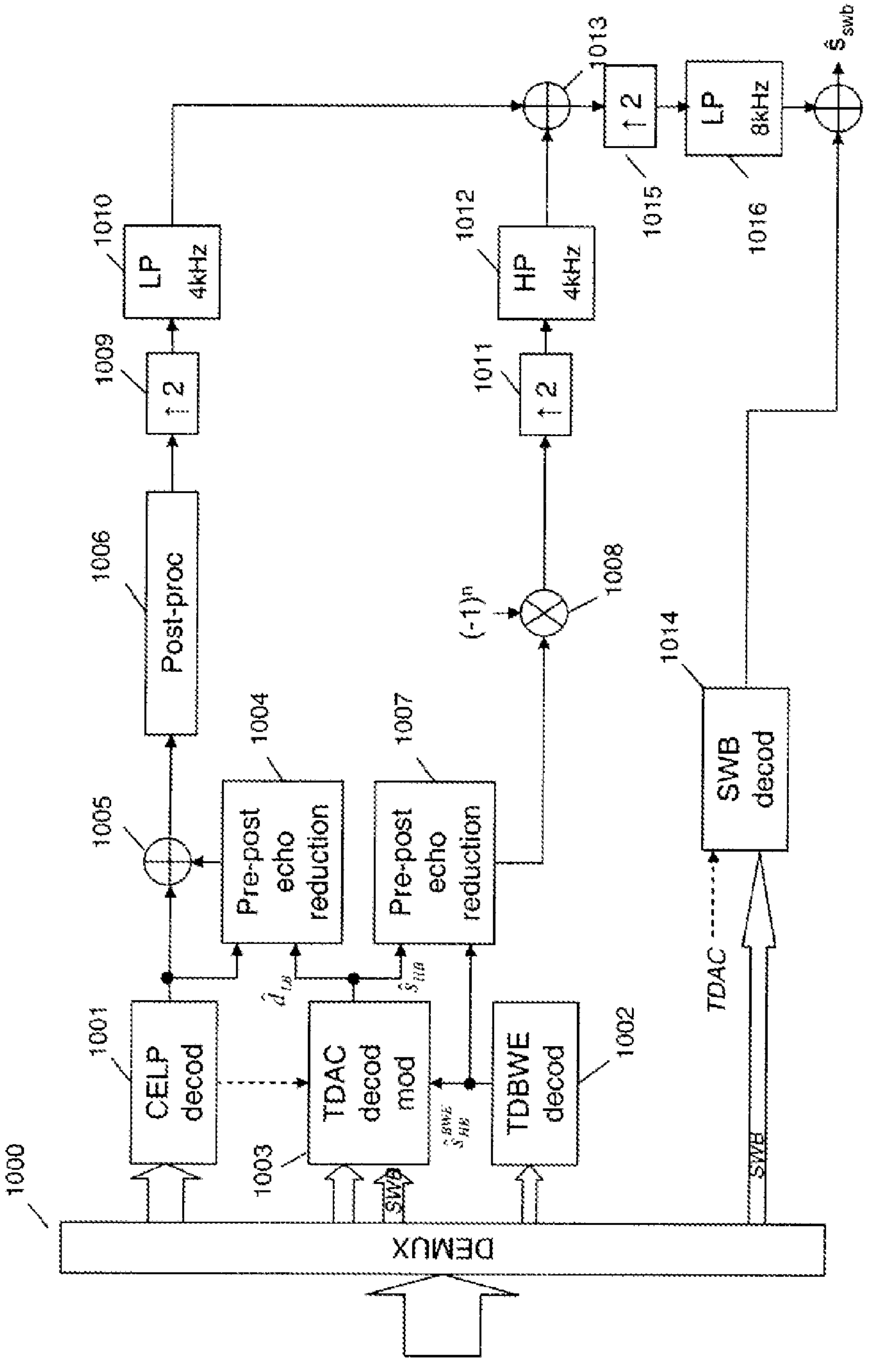
FIG. 10 illustrates the structure of a frequency-band-extended G.729.1 decoder in which a TDAC decoder according to one embodiment of the invention, is included.

In the same manner, a G.729.1 decoder extended to super-widened band is described with reference to FIG. 10. It comprises the same modules as the G.729.1 decoder described with reference to FIG. 2.

It comprises, however, an additional module for band extension 1014 which receives the band extension signal from the demultiplexing module 1000.

It also comprises the bank of synthesis filters (blocks 1015, 1016) making it possible to obtain the super-widened band output signal $\overline{S}_{SWb}$.

Figure 2:
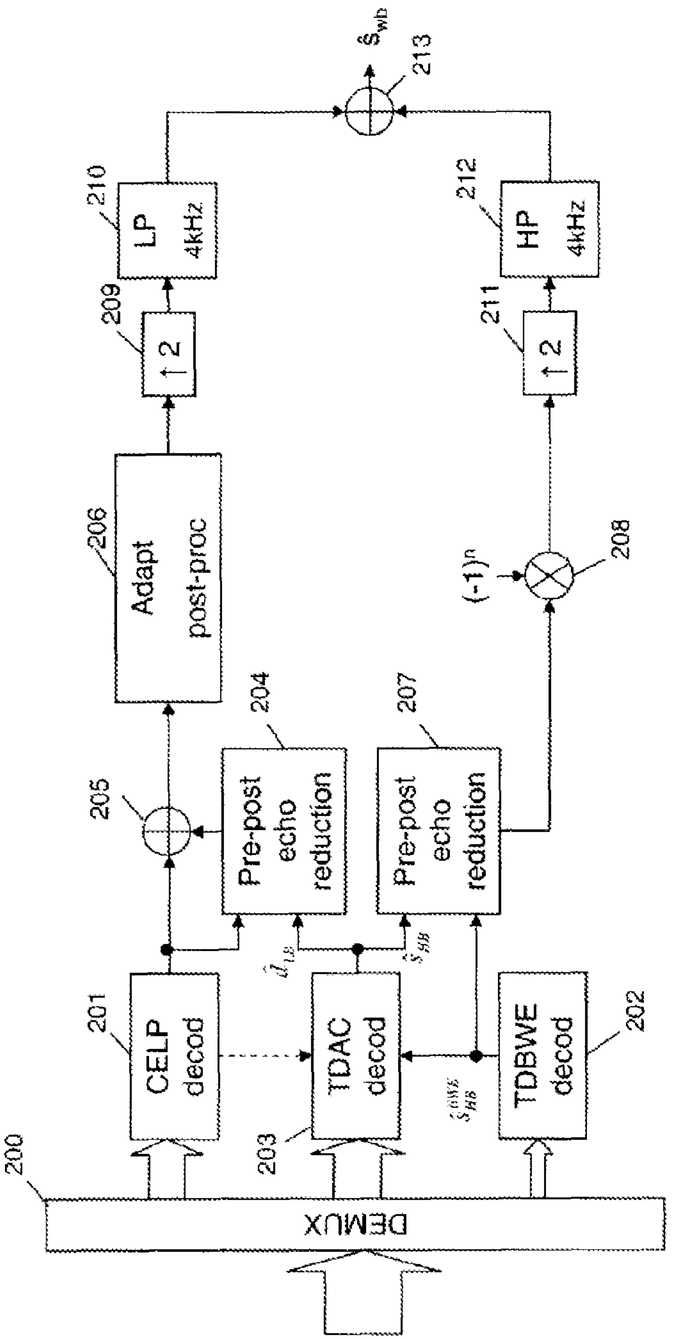
FIG. 2 illustrates the structure of a previously described decoder of G.729.1 type.

The TDAC decoding module 1003 is also different from the TDAC decoding module illustrated with reference to FIG. 2. This module is for example that described and illustrated with reference to FIG. 6. It therefore receives both the core signal and the improvement signal from the demultiplexing module.

In the favored embodiment presented previously, the invention is used to improve the quality of the TDAC coding in the G.729.1 codec. Naturally the invention applies to other types of transform coding with a binary allocation and to the scalable extension of core codecs other than G.729.1.

An exemplary hardware embodiment of the coder and of the decoder such as described with reference to FIGS. 5 and 6 is now described with reference to FIGS. 11*a* and 11*b*.

Figure 11B:
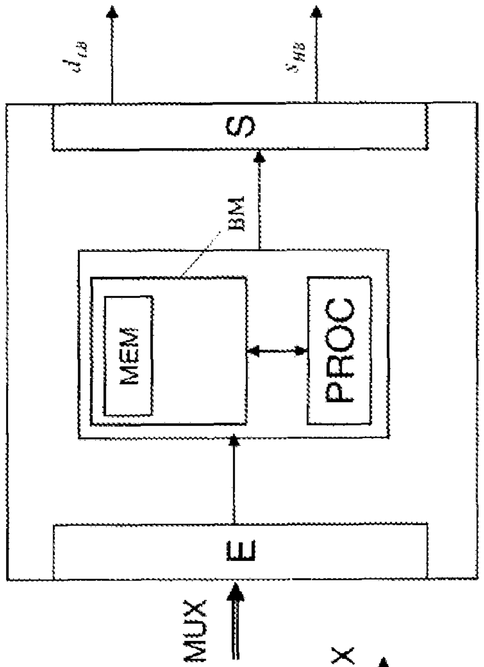
FIG. 11*b* illustrates an exemplary hardware embodiment of a terminal including a decoder according to one embodiment of the invention.
Figure 11A:
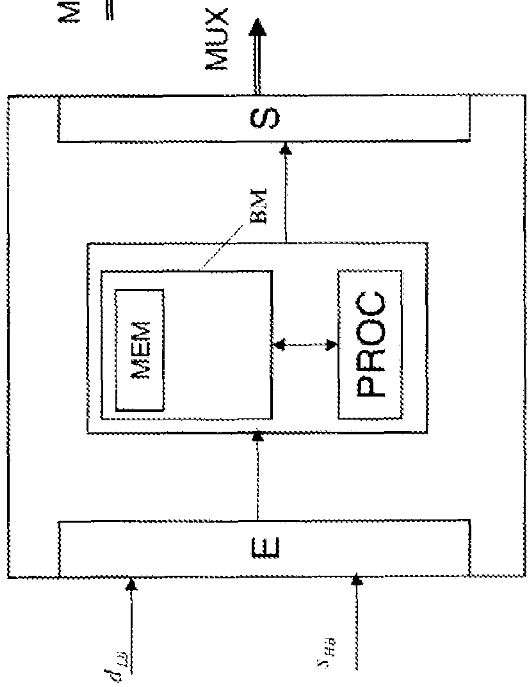
FIG. 11*a* illustrates an exemplary hardware embodiment of a terminal including a coder according to one embodiment of the invention.

Thus, FIG. 11*a* illustrates a coder or terminal comprising a coder such as described in FIG. 5. It comprises a processor PROC cooperating with a memory block BM comprising a storage and/or work memory MEM.

This terminal comprises an input module able to receive a low-band signal $d_{LB}$ and a high-band signal $S_{HB}$ or any type of digital signals to be coded. These signals may originate from another coding stage or from a communication network, from a digital content storage memory.

The memory block BM can advantageously comprise a computer program comprising code instructions for the implementation of the steps of the coding method within the meaning of an embodiment of the invention, when these instructions are executed by the processor PROC, and especially the steps of:

- calculation of a frequency masking threshold for at least part of the frequency sub-bands processed by the improvement coding;
- determination of a perceptual importance per frequency sub-band as a function of the masking threshold calculated and as a function of the number of bits allocated for the core coding;
- allocation of bits in the frequency sub-bands processed by the improvement coding, as a function of the perceptual importance determined; and
- coding of the residual signal according to the allocation of bits.

Typically, the description of FIG. 5 employs the steps of an algorithm of such a computer program. The computer program can also be stored on a memory medium readable by a reader of the terminal or coder or downloadable into the memory space of the latter.

The terminal comprises an output module able to transmit a multiplexed stream arising from the coding of the input signals.

In the same manner, FIG. 11*b* illustrates an exemplary decoder or terminal comprising a decoder such as described with reference to FIG. 6.

This terminal comprises a processor PROC cooperating with a memory block BM comprising a storage and/or work memory MEM.

The terminal comprises an input module able to receive a multiplexed stream originating for example from a communication network, from a storage module.

The memory block can advantageously comprise a computer program comprising code instructions for the implementation of the steps of the decoding method within the meaning of an embodiment of the invention, when these instructions are executed by the processor PROC, and especially the steps of:

- calculation of a frequency masking threshold for at least part of the frequency sub-bands processed by the improvement decoding;
- determination of a perceptual importance per frequency sub-band as a function of the masking threshold calculated and as a function of the number of bits allocated for the core decoding;
- allocation of bits in the frequency sub-bands processed by the improvement decoding, as a function of the perceptual importance determined; and
- decoding of the residual signal according to the allocation of bits.

Typically, the description of FIG. 6 employs the steps of an algorithm of such a computer program. The computer program can also be stored on a memory medium readable by a reader of the terminal or downloadable into the memory space of the latter.

The terminal comprises an output module able to transmit decoded signals ($d_{LB}$, $S_{HB}$) for another coding stage or for a content reconstruction.

Quite obviously, such a terminal can comprise both the coder and the decoder according to an embodiment of the invention.

The invention claimed is:

1. A method for hierarchically coding a digital audio frequency input signal as several frequency sub-bands comprising:

a core coding of the input signal in a low frequency band according to a first bit rate, the core coding using a first binary allocation according to an energy criterion; and at least one improvement coding of a higher bit rate of a residual signal in a high frequency band, wherein the improvement coding comprises:

calculation of a frequency masking threshold for at least part of the frequency bands processed by the improvement coding, the masking threshold being normalized by the value of the masking threshold at a last sub-band of the low frequency band and/or a first sub-band of the high frequency band;

determination of a perceptual importance per frequency sub-band of the high frequency band as a function of the masking threshold calculated and as a function of the number of bits allocated for the core coding;

second binary allocation of bits in the frequency sub-bands of the high frequency band processed by the improvement coding, as a function of the perceptual importance determined; and coding of the residual signal according to the second binary allocation of bits.

2. The method as claimed in claim 1, wherein the step of determining a perceptual importance comprises:

a first step of defining a first perceptual importance for at least one frequency sub-band of the improvement coding, as a function of the frequency masking threshold in the sub-band, of quantized values of the coding of the spectral envelope for the frequency sub-band and of a determined normalization factor; and a second step of subtracting from the first perceptual importance a ratio of the number of bits allocated for the core coding to the number of coefficients in said sub-band.

3. The method as claimed in claim 1, wherein the perceptual importance is determined furthermore as a function of bits allocated for previous coding stages having a binary allocation according to an energy criterion.

4. The method as claimed in claim 1, wherein the masking threshold is determined for a sub-band, by a convolution between:

an expression for a calculated spectral envelope, and a spreading function involving a central frequency of said sub-band.

5. The method as claimed in claim 1, wherein the method furthermore comprises a step of obtaining an item of information according to which the signal to be coded is tonal or non-tonal and that the steps of calculating the masking threshold and of determining a perceptual importance as a function of this masking threshold, are undertaken only if the signal is non-tonal.

6. The method as claimed in claim 1, wherein the improvement coding comprises an improvement coding of a Time Domain Aliasing Cancellation (TDAC) type in an extended coder whose core coding is of a G.729.1 standardized coder type.

7. A method for hierarchically decoding a digital audio frequency signal as several frequency sub-bands comprising;

a core decoding of a signal received according to a first bit rate in a low frequency band, the core decoding using a first binary allocation according to an energy criterion; and at least one improvement decoding of a higher bit rate of a residual signal in a high frequency band, including;

calculation of a frequency masking threshold for at least part of the frequency sub-bands processed by the improvement decoding, the masking threshold being normalized by a value of the masking threshold at a last sub-band of the low frequency band and/or a first sub-band of the high frequency band;

determination of a perceptual importance per frequency sub-band of the high frequency band as a function of the masking threshold calculated and as a function of the number of bits allocated for the core decoding;

second allocation of bits in the frequency sub-bands of the high frequency band processed by the improvement decoding, as a function of the perceptual importance determined; and decoding of the residual signal according to the second allocation of bits.

8. The decoding method as claimed in claim 7, wherein the step of determining a perceptual importance comprises:

a first step of defining a first perceptual importance for at least one frequency sub-band of the improvement decoding, as a function of the frequency masking threshold in the sub-band, of quantized values of the decoding of the spectral envelope for the frequency sub-band and of a determined normalization factor; and a second step of subtracting from the first perceptual importance a ratio of the number of bits allocated for the core decoding to the number of possible coefficients in said sub-band.

9. A hierarchical coder of a digital audio frequency input signal as several frequency sub-bands comprising:

a memory storing code instructions;

a processor, which is configured by the code instructions to implement;

a core coder of the input signal according to a first bitrate in a low frequency band, the core coder using a first binary allocation according to an energy criterion; and at least one improvement coder of a higher bit rate of a residual signal in a high frequency band, the improvement coder comprising;

a module configured to calculate a frequency masking threshold for at least part of the frequency bands processed by the improvement coder, the masking threshold being normalized by a valued of the masking threshold at a last sub-band of the low frequency band and/or a first sub-band of the high frequency band;

a module configured to determine a perceptual importance per frequency sub-band of the high frequency band as a function of the masking threshold calculated and as a function of the number of bits allocated for the core coder;

a module configured to apply a second binary allocation of bits in the frequency sub-bands of the high frequency band processed by the improvement coder, as a function of the perceptual importance determined; and a module configured to code the residual signal according to the second allocation of bits.

10. A hierarchical decoder of a digital audio frequency signal as several frequency sub-bands, comprising:

a memory storing code instructions;

a processor, which is configured by the code instructions to implement;

a core decoder of a signal received according to a first bit rate in a low frequency band, the core decoder using a first binary allocation according to an energy criterion; and at least one improvement decoder of a higher bit rate, of a residual signal in a high frequency band, the improvement decoder comprising;

a module configured to calculate a frequency masking threshold for at least part of the frequency sub-bands processed by the improvement decoder, the masking threshold being normalized by a value of the masking threshold at a last sub-band of the low frequency band and/or a first sub-band of the high frequency band;

a module configured to determine a perceptual importance per frequency sub-band of the high frequency band as a function of the masking threshold calculated and as a a function of the number of bits allocated for the core decoder;

a module configured to perform a second allocation of bits in the frequency sub-bands of the high frequency band processed by the improvement decoder, as a function of the perceptual importance determined; and a module configured to decode the residual signal according to the second allocation of bits.

11. A non-transitory computer-readable medium comprising a computer program stored therein and comprising code instructions for implementing a method of hierarchically coding a digital audio frequency input signal as several frequency sub-bands, when the instructions are executed by a processor, wherein the method comprises:

a core coding of the input signal according to a first bit rate in a low frequency band, the core coding using a first binary allocation according to an energy criterion; and at least one improvement coding of a higher bit rate of a residual signal in a high frequency band, wherein the improvement coding comprises;

calculation of a frequency masking threshold for at least part of the frequency bands processed by the improvement coding, the masking threshold being normalized by a value of the masking threshold at a last sub-band of the low frequency band and/or a first sub-band of the high frequency band;

determination of a perceptual importance per frequency sub-band of the high frequency band as a function of the masking threshold calculated and as a function of the number of bits allocated for the core coding;

second binary allocation of bits in the frequency sub-bands of the high frequency band processed by the improvement coding, as a function of the perceptual importance determined; and coding of the residual signal according to the second allocation of bits.

12. A non-transitory computer-readable medium comprising a computer program comprising code instructions for implementing a method for hierarchically decoding a digital audio frequency signal as several frequency sub-bands, when the instructions are executed by a processor, the method comprising;

a core decoding of a signal received according to a first bit rate in a low frequency band, the core decoding using a first binary allocation according to an energy criterion; and at least one improvement decoding of a higher bit rate of a residual signal in a high frequency band:

calculation of a frequency masking threshold for at least part of the frequency sub-bands processed by the improvement decoding, the masking threshold being normalized by a value of the masking threshold at a last sub-band of the low frequency band and/or a first sub-band of the high frequency band;

determination of a perceptual importance per frequency sub-band of the high frequency band as a function of the masking threshold calculated and as a function of the number of bits allocated for the core decoding;

second allocation of bits in the frequency sub-bands of the high frequency band processed by the improvement decoding, as a function of the perceptual importance determined; and decoding of the residual signal according to the second allocation of bits.

* * * * *